United States Patent
Su et al.

(10) Patent No.: US 11,334,450 B1
(45) Date of Patent: May 17, 2022

(54) BACKUP METHOD AND BACKUP SYSTEM FOR VIRTUAL MACHINE

(71) Applicant: QNAP SYSTEMS, INC., New Taipei (TW)

(72) Inventors: Jing-Wei Su, New Taipei (TW); Chien-Hung Yang, New Taipei (TW)

(73) Assignee: QNAP SYSTEMS, INC., New Taipei (TW)

( * ) Notice: Subject to any disclaimer, the term of this patent is extended or adjusted under 35 U.S.C. 154(b) by 0 days.

(21) Appl. No.: 17/227,403

(22) Filed: Apr. 12, 2021

(30) Foreign Application Priority Data

Feb. 25, 2021 (TW) ................... 110106621

(51) Int. Cl.
*G06F 11/14* (2006.01)
*G06F 11/07* (2006.01)

(52) U.S. Cl.
CPC ...... *G06F 11/1484* (2013.01); *G06F 11/0754* (2013.01); *G06F 11/1451* (2013.01); *G06F 11/1461* (2013.01); *G06F 11/1464* (2013.01); *G06F 11/1469* (2013.01); *G06F 2201/84* (2013.01)

(58) Field of Classification Search
CPC ............. G06F 11/1484; G06F 11/1451; G06F 11/1461; G06F 11/0754; G06F 11/1464; G06F 11/1469; G06F 2201/84
USPC ...................................................... 714/4.11
See application file for complete search history.

(56) References Cited

U.S. PATENT DOCUMENTS

| | | | |
|---|---|---|---|
| 8,990,617 B2 | 3/2015 | Tanaka | |
| 11,099,956 B1* | 8/2021 | Polimera | G06F 11/1451 |
| 2008/0155223 A1* | 6/2008 | Hiltgen | G06F 21/6218 |
| | | | 718/1 |

FOREIGN PATENT DOCUMENTS

| | | |
|---|---|---|
| TW | 201901425 | 1/2019 |
| TW | 202001556 | 1/2020 |

OTHER PUBLICATIONS

"Office Action of Taiwan Counterpart Application", dated Dec. 3, 2021, pp. 1-7.

* cited by examiner

*Primary Examiner* — Yair Leibovich
(74) *Attorney, Agent, or Firm* — JCIPRNET (57) ABSTRACT

A backup method and a backup system for virtual machines are provided. A first virtual machine management module replicates data of a write IO request of a first virtual machine to generate replication data, and the write IO request is configured to request a data write operation to a disk of the first virtual machine. The first virtual machine management module transmits the replication data to a second virtual machine management module while the first virtual machine is running. The second virtual machine management module receives the replication data and controls or performs a data write operation to a disk of the second virtual machine of the second virtual machine management module according to the replication data. When the first virtual machine is paused, the second virtual machine management module performs a snapshot operation on the disk of the second virtual machine to generate snapshot data.

12 Claims, 8 Drawing Sheets

BACKUP METHOD AND BACKUP SYSTEM FOR VIRTUAL MACHINE

CROSS-REFERENCE TO RELATED APPLICATION

This application claims the priority benefit of Taiwan application serial no. 110106621, filed on Feb. 25, 2021. The entirety of the above-mentioned patent application is hereby incorporated by reference herein and made a part of this specification.

BACKGROUND

Technical Field

The disclosure relates to a data backup technique, and particularly relates to a backup method and a backup system for virtual machines.

Description of Related Art

In recent years, with the rapid development of the Internet and the rise of cloud computing, many businesses have higher demand for information services, and virtual machines (VM) with high computing capacities have been widely used in various solutions. Each virtual machine may run independent operating systems and applications, and multiple virtual machines may run on the same one physical machine (PM) at the same time. Also, the hardware computing resources of the physical machine may be shared by multiple virtual machines.

When the physical machine fails or cannot operate normally, the virtual machine originally running thereon will not be able to provide normal services, and as a result, a user cannot obtain the application services provided by the virtual machine. Therefore, in order to avoid major loss resulting from downtime of the virtual machine or data loss due to failure of the physical machine, currently, a virtual machine high-availability (HA) technique using an active-standby architecture has been proposed. Physical machines in a high-availability cluster will be monitored, and if a physical machine fails so that the active virtual machine cannot provide services, a standby virtual machine may be started on a standby physical machine to continue to provide services. It is thus conceivable that in this high-availability architecture, the backup operation of the virtual machine is necessary, and the backup timing, backup frequency, and backup method of the virtual machine will directly affect the backup performance and the downtime required for the backup. Therefore, how to design an improved backup method for virtual machines that meets the requirements is one of the core issues for those skilled in the art.

SUMMARY

In view of the above, the disclosure provides a backup method and a backup system for virtual machines, which can improve the backup efficiency and reduce the downtime required for backing up a virtual machine.

An embodiment of the disclosure provides a backup method for virtual machines, including the following steps. A first virtual machine management module replicates data of a write input/output (IO) request of a first virtual machine to generate replication data, and the write IO request is configured to request a data write operation to a disk of the first virtual machine. The first virtual machine management module transmits the replication data to a second virtual machine management module while the first virtual machine is running. The second virtual machine management module receives the replication data and controls a data write operation to a disk of a second virtual machine of the second virtual machine management module according to the replication data. The second virtual machine management module performs a snapshot operation on the disk of the second virtual machine to generate snapshot data when the first virtual machine is paused.

In an embodiment of the disclosure, the first virtual machine pauses at a checkpoint, and the snapshot data reflects a status of the disk of the first virtual machine at the checkpoint.

In an embodiment of the disclosure, the backup method for virtual machines further includes the following steps. The first virtual machine management module transmits at least one dirty page of a first memory of the first virtual machine to the second virtual machine management module when the first virtual machine is paused. The second virtual machine management module receives the at least one dirty page and stores the at least one dirty page to a backup temporary storage area in a second memory of the second virtual machine. In an embodiment, a portion in the second memory is allocated as the backup temporary storage area.

In an embodiment of the disclosure, after the step of storing, by the second virtual machine management module, the at least one dirty page to the second memory of the second virtual machine in response to receiving the at least one dirty page, the backup method further includes the following step. The second virtual machine management module updates a main storage area in the second memory according to the at least one dirty page while the first virtual machine is running. In an embodiment, another portion in the second memory is allocated as the main storage area.

In an embodiment of the disclosure, the step of transmitting, by the first virtual machine management module, the at least one dirty page of the first memory to the second virtual machine management module when the first virtual machine is paused includes the following steps. The first virtual machine pauses at a checkpoint in response to expiration of a predetermined cycle of a timer. The first virtual machine management module transmits the at least one dirty page of the first memory to the second virtual machine management module in response to expiration of the predetermined cycle of the timer.

In an embodiment of the disclosure, the step of transmitting, by the first virtual machine management module, the at least one dirty page of the first memory to the second virtual machine management module when the first virtual machine is paused includes the following steps. The first virtual machine pauses at a checkpoint in response to accumulation of the at least one dirty page of the first memory to a predetermined data amount. The first virtual machine management module transmits the at least one dirty page of the first memory to the second virtual machine management module in response to accumulation of the at least one dirty page of the first memory to the predetermined data amount.

In an embodiment of the disclosure, the backup method for virtual machines further includes the following step. The second virtual machine management module performs a recovery process to perform a rollback operation on the disk of the second virtual machine by using the snapshot data when the first virtual machine fails.

An embodiment of the disclosure provides a backup system for virtual machines, including a first computing device and a second computing device. The first computing device includes a first virtual machine management module running a first virtual machine. The first virtual machine management module replicates data of a write IO request of the first virtual machine to generate replication data, and the write IO request is configured to request a data write operation to a disk of the first virtual machine. The second computing device is connected to the first computing device and includes a second virtual machine management module running a second virtual machine. The first virtual machine management module transmits the replication data to the second virtual machine management module while the first virtual machine is running, and the second virtual machine management module receives the replication data and controls a data write operation to a disk of the second virtual machine according to the replication data. When the first virtual machine is paused, the second virtual machine management module performs a snapshot operation on the disk of the second virtual machine to generate snapshot data.

Based on the above, in the embodiments of the disclosure, while the first virtual machine is running, backup of the disk of the first virtual machine is performed continuously, so that the disk of the first virtual machine can be synchronized to the disk of the second virtual machine. After the first virtual machine enters the pause state at the checkpoint, the second virtual machine management module may perform a snapshot operation on the disk of the second virtual machine to generate snapshot data corresponding to the checkpoint. Accordingly, it is not necessary to execute data replication and data transmission required for backing up the disk of the first virtual machine during downtime, which thereby significantly reduces the downtime required for the backup.

To make the aforementioned more comprehensible, several embodiments accompanied with drawings are described in detail as follows.

DESCRIPTION OF THE EMBODIMENTS

Some of the embodiments of the disclosure will be described in detail below with reference to the accompanying drawings. Components labeled with the same reference numerals shown in different drawings will be regarded as the same or similar components. The embodiments are only a part of the disclosure and do not disclose all the possible implementations of the disclosure. More specifically, the embodiments are only examples of the system and the method in the claims of the disclosure.

Figure 1A:
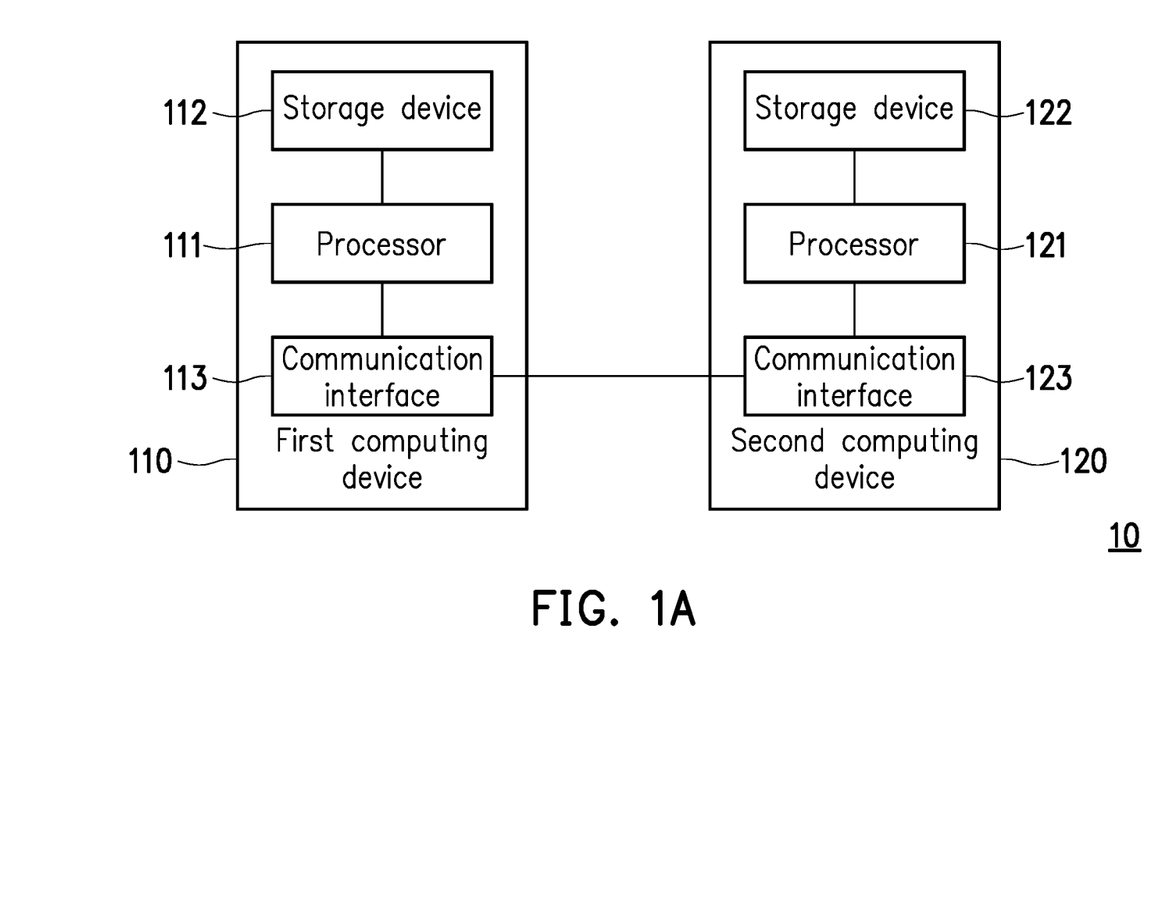
FIG. 1A is a block diagram showing a backup system for virtual machines according to an embodiment of the disclosure.
Figure 1B:
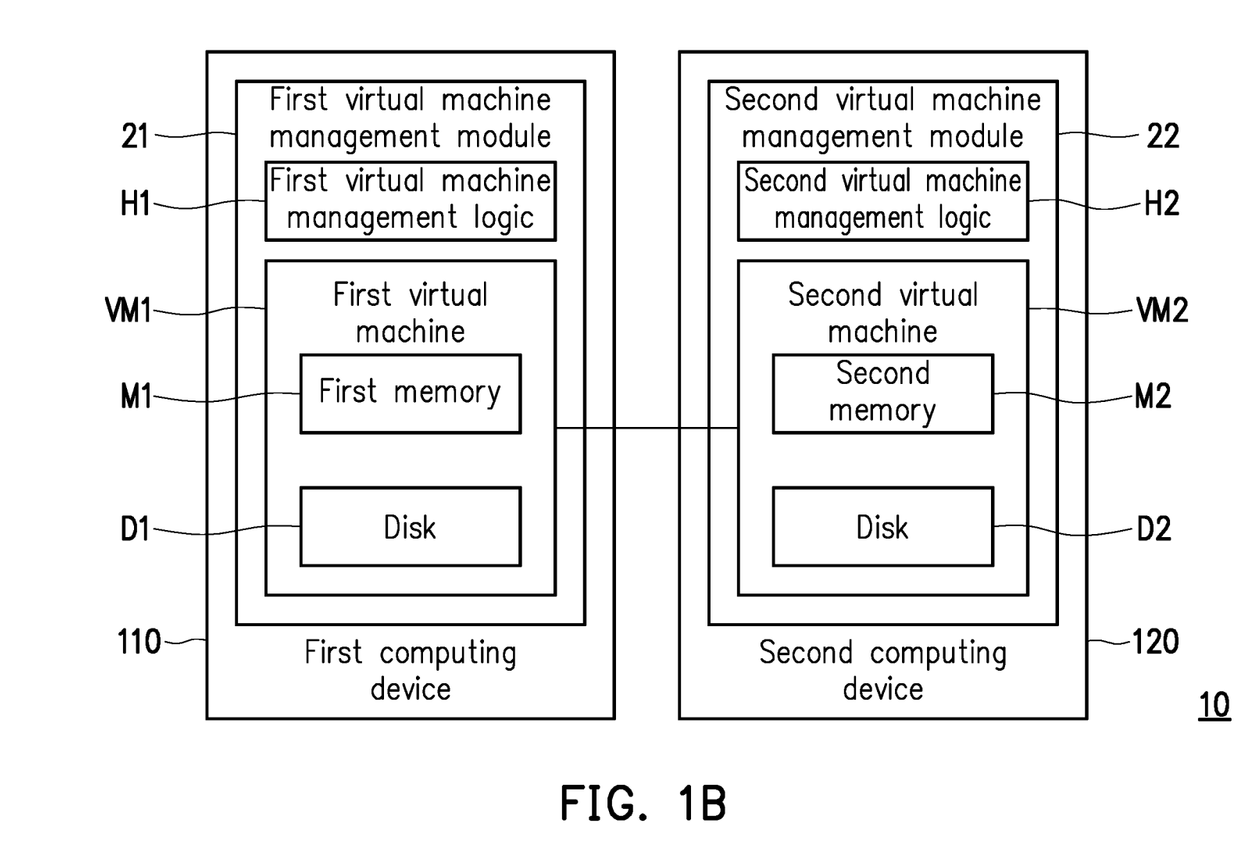
FIG. 1B is a schematic view showing a backup system for virtual machines according to an embodiment of the disclosure.

FIG. 1A is a block diagram showing a backup system for virtual machines according to an embodiment of the disclosure. FIG. 1B is a schematic view showing a backup system for virtual machines according to an embodiment of the disclosure. Referring to FIG. 1A and FIG. 1B together, a backup system 10 for virtual machines includes a first computing device 110 and a second computing device 120. The first computing device 110 and the second computing device 120 are also referred to as physical machines (PM) and may be implemented by various physical electronic devices such as server computers.

The first computing device 110 includes a processor 111, a storage device 112, and a communication interface 113. The second computing device 120 includes a processor 121, a storage device 122, and a communication interface 123. The first computing device 110 and the second computing device 120 may be connected via the communication interface 113 and the communication interface 123 to transmit data or communicate with each other.

The storage devices 112 and 122 are configured to store data and program codes (e.g., operating systems, applications, driver programs, etc.) for the processors 111 and 121 to access, and may be implemented by non-transitory, volatile, or non-volatile memories in any form. For example, the storage devices 112 and 122 may be fixed or movable random access memories (RAM), read-only memories (ROM), flash memories, hard disk drives, solid-state drives, or hybrid drives in any form, or combinations of the above, and the disclosure is not limited thereto.

The processors 111 and 121 are respectively configured to control the operation of the first computing device 110 and the second computing device 120 and may be, for example, central processing units (CPU), application processors (AP), or other programmable general-purpose or specific-purpose microprocessors, digital signal processors (DSP), other similar devices, integrated circuits, or combinations of the above, and the disclosure is not limited thereto.

The communication interfaces 113 and 123 may be transmission interfaces supporting various wireless and wired communications, and the disclosure is not limited thereto.

The first computing device 110 and the second computing device 120 may respectively run one or more virtual machines. In the example of FIG. 1B, the first computing device 110 includes a first virtual machine management module 21 running a first virtual machine VM1, the second computing device 120 includes a second virtual machine management module 22 running a second virtual machine VM2. Although this example is described with two computing devices and two virtual machines, the disclosure is not limited thereto. The first virtual machine management module 21 and the second virtual machine management module 22 may be respectively implemented by combinations of software components and hardware components of the first computing device 110 and the second computing device 120.

The first virtual machine management module 21 includes the first virtual machine VM1 and a first virtual machine management logic H1. The second virtual machine management module 22 includes the second virtual machine VM2 and a second virtual machine management logic H2. Specifically, one or more virtual machines running on the first computing device 110 may share the physical calculation resources provided by the first computing device 110, such as the computing resources of the processor 111 and the storage resources of the storage device 112. The first virtual machine management logic H1 executed by the first computing device 110 is responsible for allocating the physical calculation resources to each virtual machine, which thus separates the operating system of the virtual machine from the hardware. In other words, the first virtual machine management logic H1 may be implemented, for example, as a hypervisor or a virtual machine monitor (VMM). Based on similar principles, the physical calculation resources are allocated by the second virtual machine management logic H2, so that one or more virtual machines running on the second computing device 120 can share the physical calculation resources provided by the second computing device 120. Therefore, as shown in FIG. 1B, the first virtual machine VM1 may include a first memory M1 and a disk D1 and may independently execute its own operating system. Similarly, the second virtual machine VM2 may include a second memory M2 and a disk D2 and may independently execute its own operating system.

It is noted that, in some embodiments, in an active-standby architecture of a virtual machine high-availability technique, the first virtual machine VM1 may be referred to as a primary virtual machine (PVM), and the second virtual machine VM2 may be referred to as a standby virtual machine (SVM). In other words, the second virtual machine VM2 is a backup virtual machine when the first virtual machine VM1 cannot provide services normally. It is conceivable that in order to allow the second virtual machine VM2 to continue to provide services to a user in place of the first virtual machine VM1, it is necessary to back up the system execution status and the storage data of the first virtual machine VM1 to the second virtual machine VM2.

Figure 2:
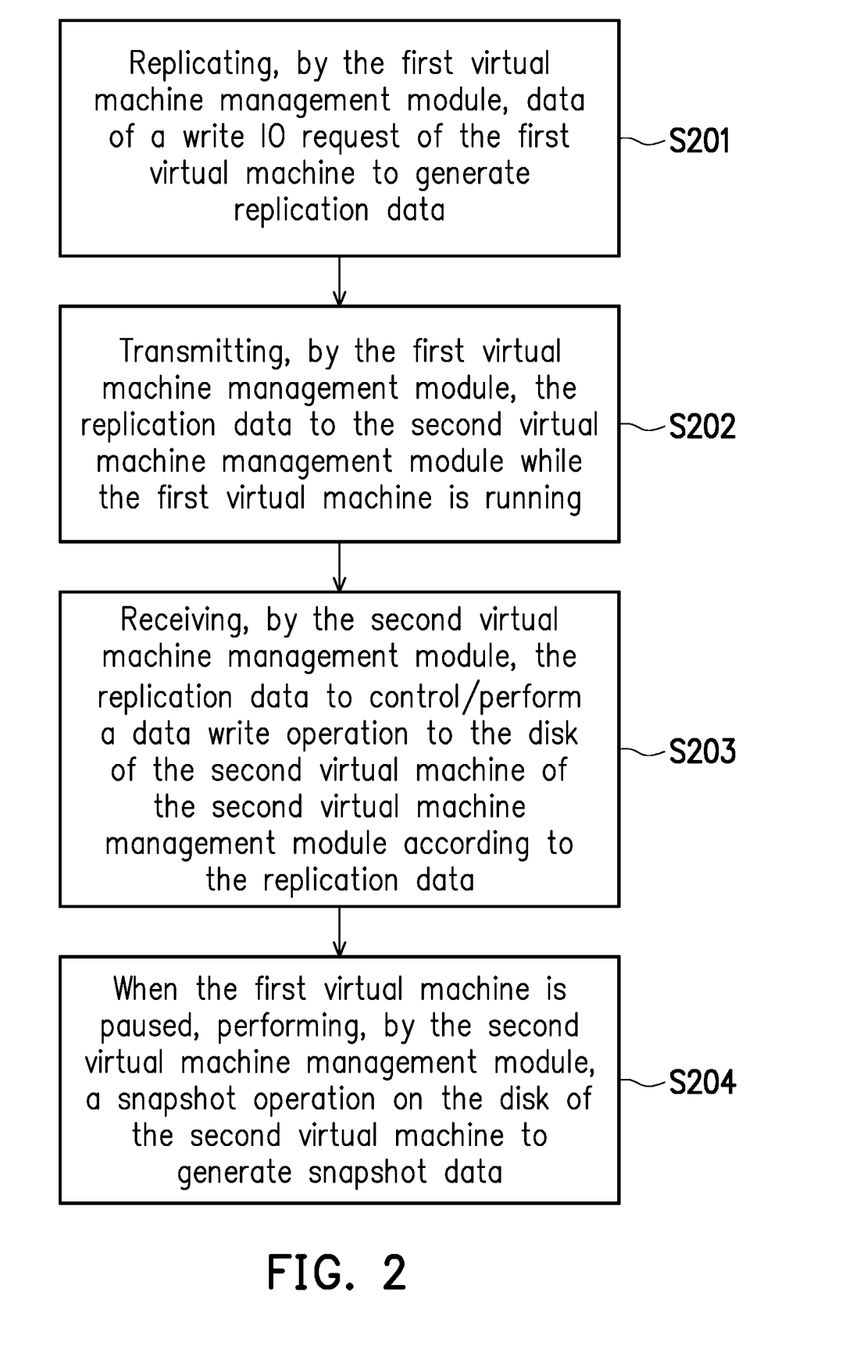
FIG. 2 is a flowchart of a backup method for virtual machines according to an embodiment of the disclosure.

FIG. 2 is a flowchart of a backup method for virtual machines according to an embodiment of the disclosure. Referring to FIG. 2, the method of this embodiment is applicable to the backup system 10 in the above embodiment, and the detailed steps of this embodiment will be described below with reference to the components in the backup system 10. In step S201, the first virtual machine management module 21 replicates data of a write input/output (IO) request of the first virtual machine VM1 to generate replication data. The write IO request is configured to request a data write operation to the disk D1 of the first virtual machine VM1 and may include a direct IO request or a buffer IO request. Specifically, when the application or operating system of the first virtual machine VM1 issues write IO requests for writing data to the disk D1, the first virtual machine management module 21 may control and perform data write operations to the disk D1 according to the write IO requests, and the first virtual machine management module 21 may replicate data of the write IO requests to generate replication data. The replication data may include the write data and the write address in the write IO request.

In step S202, the first virtual machine management module 21 transmits the replication data to the second virtual machine management module 22 while the first virtual machine VM1 is running. In other words, the first virtual machine management module 21 may continuously replicate the data of the write IO request and transmit the replication data to the second virtual machine management module 22 during the normal operation of the first virtual machine VM1. In step S203, the second virtual machine management module 22 receives the replication data and controls/performs a data write operation to the disk D2 of the second virtual machine VM2 of the second virtual machine management module 22 according to the replication data. Therefore, during the period in which the first virtual machine VM1 operates in the normal running state, the data stored in the disk D1 of the first virtual machine VM1 may be synchronously replicated to the disk D2 of the second virtual machine VM2.

Next, in step S204, when the first virtual machine VM1 is paused, the second virtual machine management module 22 performs a snapshot operation on the disk D2 of the second virtual machine VM2 to generate snapshot data associated with the disk D2. During the pause of the first virtual machine VM1, the application or operating system of the first virtual machine VM1 does not issue a write IO request for requesting data writing, so the snapshot data associated with the disk D2 may be regarded as the backup data of the disk D1 at a specific time point. The first virtual machine VM1 switches from the running state to the pause state at the above specific time point, and this specific time point may be referred to as a checkpoint in the following embodiments.

Accordingly, since the data stored in the disk D1 of the first virtual machine VM1 in the running state can be synchronously replicated to the disk D2 of the second virtual machine VM2 and a snapshot operation is performed on the disk D2 of the second virtual machine VM2, the storage data of the disk D1 of the first virtual machine VM1 at the specific time point can be successfully backed up, and it is not necessary to pause the first virtual machine VM1 for a long time to replicate and back up the data of the disk D1 to the disk D2. Therefore, in some embodiments, when the first virtual machine VM1 fails, the second virtual machine management module 22 may perform a recovery process to perform a rollback operation on the disk D2 of the second virtual machine VM2 by using the snapshot data.

Figure 3:
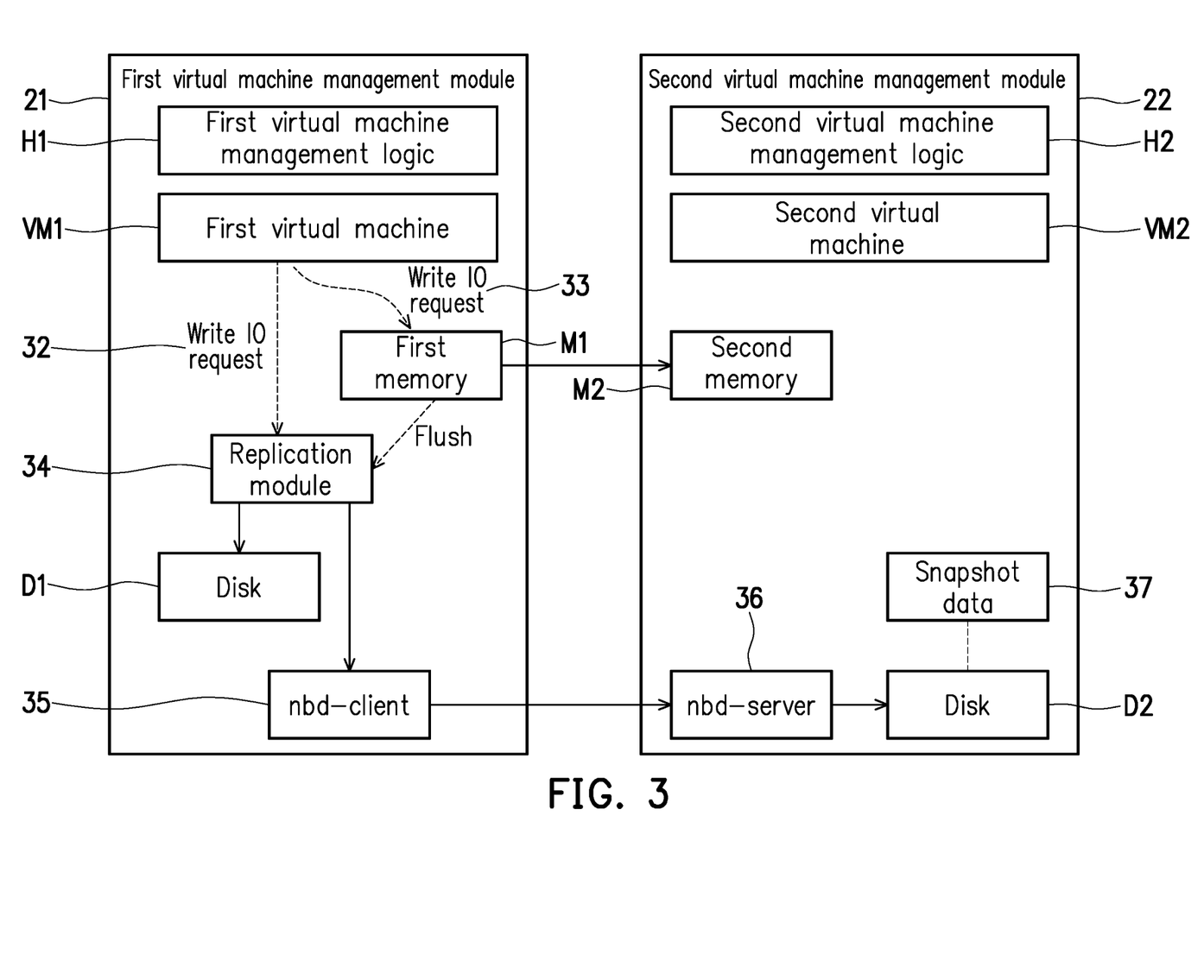
FIG. 3 is a schematic view showing a backup method for virtual machines according to an embodiment of the disclosure.

FIG. 3 is a schematic view showing a backup method for virtual machines according to an embodiment of the disclosure. Referring to FIG. 3, the first virtual machine VM1 of the first virtual machine management module 21 may issue write IO requests 32 and 33 for requesting data write operations to the disk D1. In this example, the write IO request 32 is a direct IO request, so the first virtual machine VM1 may directly provide the write IO request 32 to a replication module 34 of the first virtual machine management module 21. In some embodiments, the replication module 34 may be implemented by a driver program. Afterwards, the disk D1 performs a data write operation according to the write IO request 32, and the replication module 34 may replicate the data of the write IO request 32 to generate replication data. The replication data may be transmitted to the disk D2 of the second virtual machine VM2 through a network block device (NBD) technique of the Linux system. Specifically, by deploying an nbd-client 35 at the first virtual machine management module 21 and deploying an nbd-server 36 at the second virtual machine management module 22, the first virtual machine management module 21 can transmit the replication data to the second virtual machine management module 22 via a TCP/IP network, so that the replication data can be subsequently written to the disk D2 of the second virtual machine VM2.

On the other hand, in this example, the write IO request 33 is a buffer IO request, and the data is first written to a page cache of the first memory M1. Afterwards, the data in the page cache is flushed to the disk D1 at a specific time, and meanwhile, the replication module 34 may accordingly replicate the data of the write IO request 33 to generate replication data. Similarly, the replication data may be transmitted to the second virtual machine management module 22 via the nbd-client 35 and the nbd-server 36, so that the replication data can be subsequently written to the disk D2 of the second virtual machine VM2.

Therefore, the first virtual machine management module 21 can continuously synchronize the write data of the disk D1 to the disk D2 while the first virtual machine VM1 is running. When the first virtual machine VM1 pauses at the checkpoint, the second virtual machine management module 22 may perform a snapshot operation on the disk D2 to obtain snapshot data 37.

It is noted that, in some embodiments, in addition to backing up the data of the disk D1 of the first virtual machine VM1, it is also necessary to back up the record data of the first memory M1 to the second memory M2 so as to back up the system execution status and the memory status of the first virtual machine VM1 to the second virtual machine VM2. As shown in FIG. 3, when the first virtual machine VM1 is paused, the first virtual machine management module 21 may transmit dirty pages of the first memory M1 to the second virtual machine management module 22, and the second virtual machine management module 22 first records the dirty pages in a backup temporary storage area of the second memory M2. The backup temporary storage area is specifically configured to record the dirty pages from the first virtual machine VM1. After the transmission and storage of the dirty pages are completed, the first virtual machine VM1 may switch back to the running state. Afterwards, the second virtual machine management module 22 may update the memory status of a main storage area of the second memory M2 by using the dirty pages in the backup temporary storage area, so that the memory status of the first memory M1 at the checkpoint can be backed up to the main storage area of the second memory M2. Further descriptions will be provided in the following embodiments.

Figure 4:
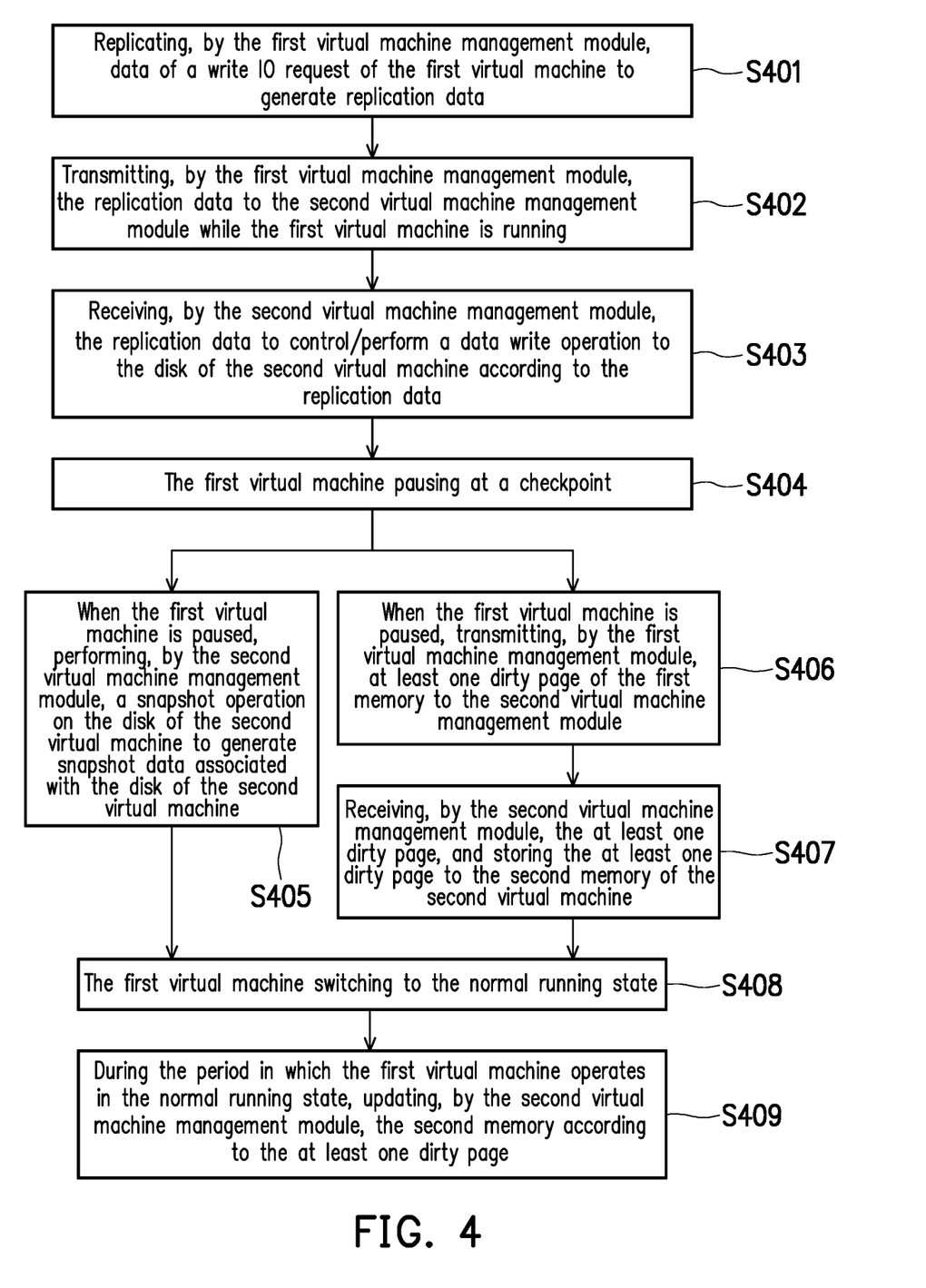
FIG. 4 is a flowchart of a backup method for virtual machines according to an embodiment of the disclosure.

FIG. 4 is a flowchart of a backup method for virtual machines according to an embodiment of the disclosure. Referring to FIG. 4, the method of this embodiment is applicable to the backup system 10 in the above embodiment, and the detailed steps of this embodiment will be described below with reference to the components in the backup system 10. In step S401, the first virtual machine management module 21 replicates data of a write IO request of the first virtual machine VM1 to generate replication data. In step S402, the first virtual machine management module 21 transmits the replication data to the second virtual machine management module 22 while the first virtual machine VM1 is running. In step S403, the second virtual machine management module 22 receives the replication data and controls/performs a data write operation to the disk D2 of the second virtual machine VM2 according to the replication data. The operation details of step S401 to step S403 may be learned from the above embodiment and shall not be repeatedly described herein.

In step S404, the first virtual machine VM1 pauses at a checkpoint. While the first virtual machine VM1 operates in the pause state during downtime, the first virtual machine VM1 stops providing services to the user, and no data is written to the first memory M1 and the disk D1.

In step S405, when the first virtual machine VM1 is paused, the second virtual machine management module 22 performs a snapshot operation on the disk D2 of the second virtual machine VM2 to generate snapshot data associated with the disk D2 of the second virtual machine VM2. The operation details of step S405 may be learned from the above embodiment and shall not be repeatedly described herein. The first virtual machine VM1 enters the pause state at the checkpoint, and the snapshot data associated with the disk D2 reflects the status of the disk D1 at the checkpoint.

In step S406, when the first virtual machine VM1 is paused, the first virtual machine management module 21 transmits at least one dirty page of the first memory M1 to the second virtual machine management module 22. Specifically, the first virtual machine management module 21 may collect dirty pages which have been updated since the previous checkpoint and transmit the collected dirty pages to the second virtual machine management module 22.

In step S407, the second virtual machine management module 22 receives the at least one dirty page and stores the at least one dirty page to the second memory M2 of the second virtual machine VM2. Specifically, the second virtual machine VM2 first records the dirty pages in a backup temporary storage area in the second memory M2. The backup temporary storage area is specifically configured to temporarily store the dirty pages from the first virtual machine VM1.

In step S408, the first virtual machine VM1 switches to the normal running state. Therefore, it is learned that when the first virtual machine VM1 is paused, the dirty pages of the first memory M1 may be backed up to the second memory M2, and the second virtual machine management module 22 completes a disk snapshot of the disk D2. It is noted that the duration of the pause of the first virtual machine VM1 is determined according to the data amount of the dirty pages. The greater the data amount of the dirty pages is, the more downtime it takes to transmit the dirty pages. The less the data amount of the dirty pages is, the less downtime it takes to transmit the dirty pages.

Then, in step S409, while the first virtual machine VM1 operates in the running state, the second virtual machine management module 22 updates the second memory M2 according to the at least one dirty page. Specifically, the second virtual machine management module 22 may update the memory status of the main storage area of the second memory M2 according to the dirty pages in the backup temporary storage area, so that the data storage status of the main storage area of the second memory M2 can be identical to the data storage status of the first memory M1 at the checkpoint. Based on the embodiment of FIG. 4, it is learned that the backup operation of the disk D1 and the backup operation of the first memory M are processed separately, and it only takes the first virtual machine VM a shorter downtime to complete the memory backup.

Figure 5A:
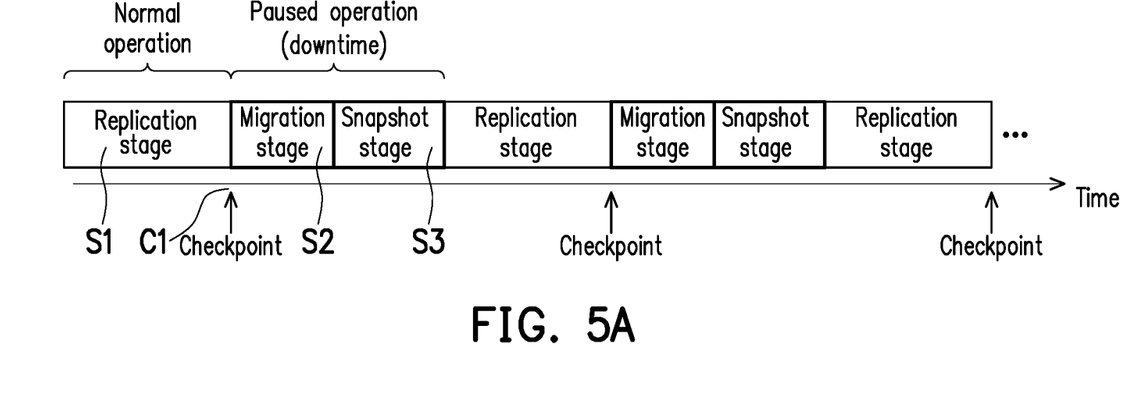
FIG. 5A and FIG. 5B are schematic views showing three stages of backing up a virtual machine according to an embodiment of the disclosure.
Figure 5B:
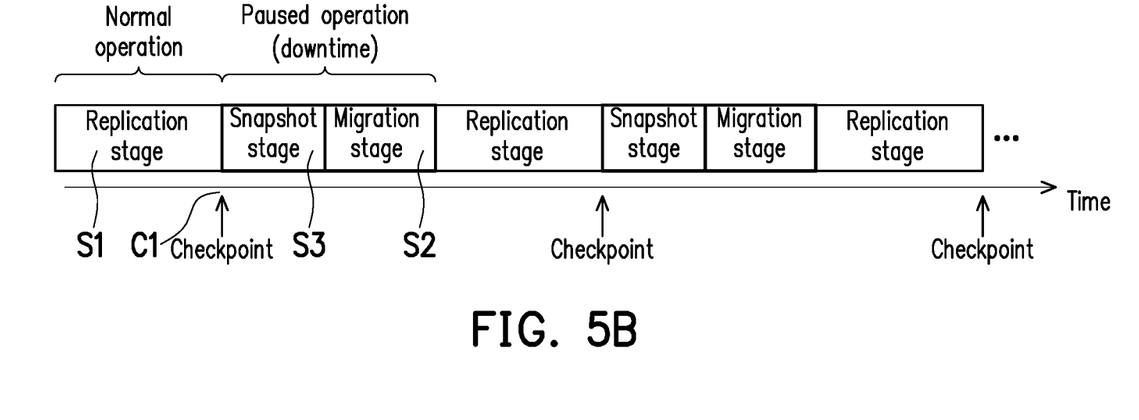

FIG. 5A and FIG. 5B are schematic views showing three stages of backing up a virtual machine according to an embodiment of the disclosure. Referring to FIG. 5A and FIG. 5B together first, in some embodiments, the backup cycle of a virtual machine may be divided into three stages, including a replication stage S, a migration stage (2, and a snapshot stage 3. In the replication stage S, the first virtual machine VM1 is running. In the migration stage S2 and the snapshot stage S3, the first virtual machine VM1 is paused. Table 1 shows the operation states of the first virtual machine VM1 and the second virtual machine VM2 respectively in the three stages and the operation executed by the first virtual machine management module 21 and the second virtual machine management module 22 according to an embodiment.

TABLE 1

| | Operation state of first virtual machine | Operation executed by first virtual machine management module | Operation state of second virtual machine | Operation executed by second virtual machine management module |
| --- | --- | --- | --- | --- |
| Replication stage | Running | Replicating data of write IO | Pause | (1) Receiving replication data and controlling/ |

TABLE 1-continued

| Operation state of first virtual machine | Operation executed by first virtual machine management module | Operation state of second virtual machine | Operation executed by second virtual machine management module |
|---|---|---|---|
| | request and transmitting replication data | | performing data write operation to disk of second virtual machine (2) Updating second memory according to dirty pages |
| Migration stage | Pause | Transmitting dirty pages | Pause | Receiving and storing dirty pages |
| Snapshot stage | Pause | | Pause | Performing snapshot operation |

In the example of FIG. 5A, the first virtual machine VM1 enters the migration stage S2 from the replication stage S1 at the checkpoint C1. After the first virtual machine management module 21 and the second virtual machine management module 22 complete the relevant operations required in the migration stage S2, the second virtual machine management module 22 then enters the snapshot stage S3 to perform a snapshot operation on the disk D2. Alternatively, in the example of FIG. 5B, the first virtual machine VM1 enters the snapshot stage S3 from the replication stage S1 at the checkpoint C1. After the second virtual machine management module 22 completes the relevant operations required in the snapshot stage S3, the first virtual machine management module 21 and the second virtual machine management module 22 then enter the migration stage S2 to perform relevant operations of backing up the memory. In other words, the disclosure does not limit the sequence of the migration stage S2 and the snapshot stage S3, which may be determined according to the actual applications. Referring to FIG. 5A and FIG. 5B, it is learned that the snapshot data generated in the snapshot stage S3 may be used to recover the disk D2 to the status of the disk D1 at the checkpoint C1. The dirty pages transmitted in the migration stage S2 may be used to recover the second memory M2 to the status of the first memory M1 at the checkpoint C1.

It is noted that, in some embodiments, the duration of the replication stage S1 may be a fixed value. Alternatively, in some embodiments, the duration of the replication stage S1 may be a variable value that is dynamically determined according to the data amount of the dirty pages collected by the first virtual machine management module 21. In other words, in some embodiments, the checkpoint may be set periodically. In some embodiments, the checkpoint may also be set according to the accumulated data amount of the write data of the first memory M1.

In some embodiments, in response to expiration of a predetermined cycle of a timer, the first virtual machine VM1 pauses at the checkpoint. In response to expiration of the predetermined cycle of the timer, the first virtual machine management module 21 transmits at least one dirty page of the first memory M1 to the second virtual machine management module 22. In other words, the first virtual machine VM1 may enter the pause state at an interval of a predetermined cycle, and the duration of the predetermined cycle is the duration in which the first virtual machine VM1 operates in the running state. The duration of the predetermined cycle may be set according to the actual requirements and is not specifically limited herein.

In some embodiments, in response to accumulation of the at least one dirty page of the first memory M1 to a predetermined data amount, and the first virtual machine VM1 pauses at a checkpoint. In response to accumulation of the at least one dirty page of the first memory M1 to the predetermined data amount, the first virtual machine management module 21 transmits the at least one dirty page of the first memory M1 to the second virtual machine management module 22. The predetermined data amount may be set according to the actual requirements and is not specifically limited herein. In other words, when the first memory M1 frequently executes the data write operation, in order to avoid an excessively long transmission time of the dirty pages, the checkpoint is set in response to accumulation of the at least one dirty page of the first memory M1 to the predetermined data amount. For example, when the at least one dirty page of the first memory M1 accumulates to 2 GB, the first virtual machine VM1 enters the pause state at the checkpoint.

Figure 6:
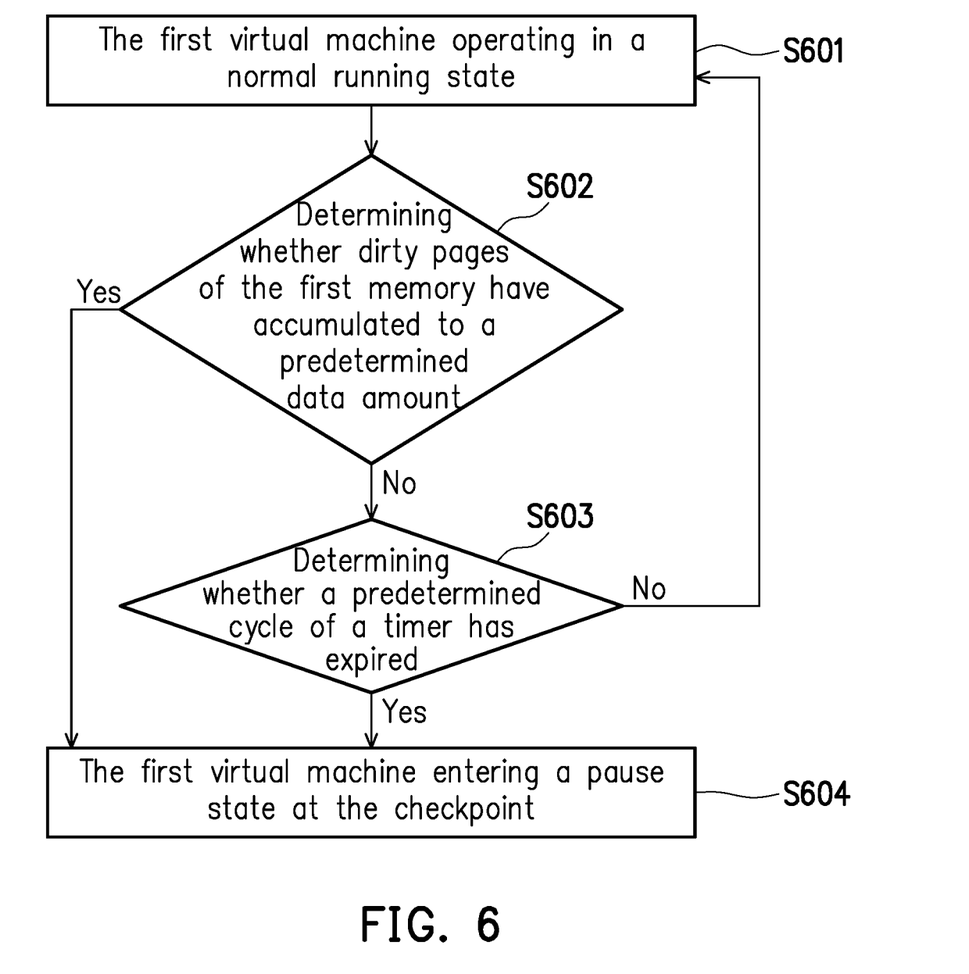
FIG. 6 is a flowchart of determination of a checkpoint according to an embodiment of the disclosure.

In addition, in some embodiments, the checkpoint may be set in different periods respectively according to the accumulated data amount of the at least one dirty page or the predetermined cycle of the timer. Specifically, in a period of a high IO load, the checkpoint may be set according to the accumulated data amount of the at least one dirty page. In a period of a low IO load, the checkpoint may be set according to the predetermined cycle of the timer. Alternatively, in some embodiments, the checkpoint may be determined according to both the accumulated data amount of the at least one dirty page and the predetermined cycle of the timer. FIG. 6 is a flowchart of determination of a checkpoint according to an embodiment of the disclosure. Referring to FIG. 6, in step S601, the first virtual machine VM1 operates in a running state, i.e., the virtual operating system of the first virtual machine VM1 is running. In step S602, the first virtual machine management module 21 determines whether dirty pages of the first memory M1 accumulated since the previous checkpoint have accumulated to a predetermined data amount. If the determination in step S602 is "Yes", in step S604, the first virtual machine VM1 enters a pause state at the current checkpoint, i.e., the virtual operating system of the first virtual machine VM1 is paused. If the determination in step S602 is "No", in step S603, the first virtual machine management module 21 determines whether a predetermined cycle of a timer has expired. If the determination in step S603 is "Yes", in step S604, the first virtual machine VM1 enters the pause state at the current checkpoint. If the determination in step S603 is "No", returning to step S601, the first virtual machine VM1 operates in the running state.

Figure 7:
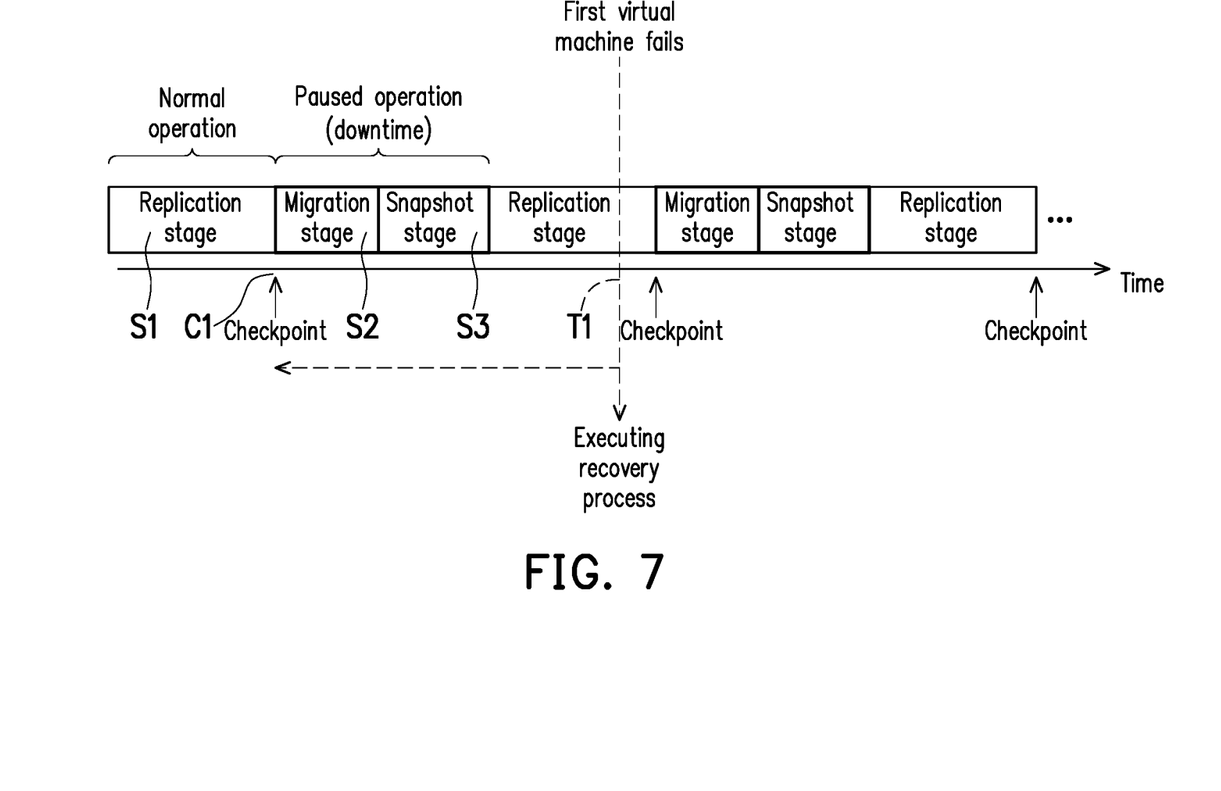
FIG. 7 is a sequence diagram of a recovery process of a second virtual machine according to an embodiment of the disclosure.

FIG. 7 is a sequence diagram of a recovery process of a second virtual machine according to an embodiment of the disclosure. Referring to FIG. 7, assuming that the first virtual machine VM1 fails at a time T1 and cannot provide services, the second virtual machine management module 22 may execute a recovery process, so that the storage data of the disk D1 and the first memory M1 at the most recent checkpoint C1 can be recovered to the disk D2 and the second memory M2. Specifically, the second virtual machine management module 22 may update the second memory M2 by using the dirty pages received in the migration stage S2, and the second virtual machine management module 22 may perform a rollback operation on the disk D2 by using the snapshot data generated in the snapshot stage S3. The implementation details of the rollback operation are known to those skilled in the art, so they shall not be repeatedly described herein. Then, the virtual operating system of the second virtual machine VM2 may be started to continue to provide services to the user in place of the first virtual machine VM1, thereby achieving high-availability of the virtual machines.

In summary of the above, in the embodiments of the disclosure, in the process of backing up a virtual machine, the backup operation of the disk and the backup operation of the memory are processed separately. The first virtual machine management module in the running state may continuously transmit the replication data to the second virtual machine management module, so that the second virtual machine management module can control and perform a data write operation to the disk of the second virtual machine according to the replication data. Accordingly, the backup data of the disk does not need to be transmitted during downtime, so the first virtual machine can complete the backup operation of the memory in a shorter downtime. With reduced downtime, more checkpoints can be allowed per unit time and thereby the amount of data loss can be reduced. In addition, since the checkpoint may be set periodically or dynamically according to the amount of data written to the memory, the setting of the checkpoint is more flexible and can meet the requirements of different IO loads, thereby improving the backup performance.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A backup method for virtual machines, comprising:
   replicating, by a first virtual machine management module, data of a write input/output request of a first virtual machine to generate replication data, wherein the write input/output request is configured to request a data write operation to a disk of the first virtual machine;
   transmitting, by the first virtual machine management module, the replication data to a second virtual machine management module while the first virtual machine is running;
   receiving, by the second virtual machine management module, the replication data to control a data write operation to a disk of a second virtual machine of the second virtual machine management module according to the replication data; and
   performing, by the second virtual machine management module, a snapshot operation on the disk of the second virtual machine to generate snapshot data when the first virtual machine is paused,
   wherein the first virtual machine pauses at a checkpoint, and the snapshot data reflects a status of the disk of the first virtual machine at the checkpoint.

2. The backup method for virtual machines according to claim 1, wherein the first virtual machine pauses at a checkpoint, and the backup method further comprises:
   transmitting, by the first virtual machine management module, at least one dirty page of a first memory of the first virtual machine to the second virtual machine management module when the first virtual machine is paused; and
   storing, by the second virtual machine management module, the at least one dirty page to a backup temporary storage area in a second memory of the second virtual machine in response to receiving the at least one dirty page.

3. The backup method for virtual machines according to claim 2, wherein after the storing, by the second virtual machine management module, the at least one dirty page to the backup temporary storage area in the second memory of the second virtual machine in response to receiving the at least one dirty page, the backup method further comprises:
   updating, by the second virtual machine management module, a main storage area in the second memory according to the at least one dirty page while the first virtual machine is running.

4. The backup method for virtual machines according to claim 2, wherein the transmitting, by the first virtual machine management module, the at least one dirty page of the first memory to the second virtual machine management module when the first virtual machine is paused further comprises:
   the first virtual machine pausing at a checkpoint in response to expiration of a predetermined cycle of a timer; and
   transmitting, by the first virtual machine management module, the at least one dirty page of the first memory to the second virtual machine management module in response to expiration of the predetermined cycle of the timer.

5. The backup method for virtual machines according to claim 2, wherein the transmitting, by the first virtual machine management module, the at least one dirty page of the first memory to the second virtual machine management module when the first virtual machine is paused further comprises:
   the first virtual machine pausing at a checkpoint in response to accumulation of the at least one dirty page of the first memory to a predetermined data amount; and
   transmitting, by the first virtual machine management module, the at least one dirty page of the first memory to the second virtual machine management module in response to accumulation of the at least one dirty page of the first memory to the predetermined data amount.

6. The backup method for virtual machines according to claim 1, further comprising:
   performing, by the second virtual machine management module, a rollback operation on the disk of the second virtual machine by using the snapshot data when the first virtual machine fails.

7. A backup system for virtual machines, comprising:
   a first computing device comprising a first virtual machine management module running a first virtual machine, wherein the first virtual machine management module replicates data of a write input/output request of the first virtual machine to generate replication data, and the write input/output request is configured to request a data write operation to a disk of the first virtual machine; and
   a second computing device connected to the first computing device and comprising a second virtual machine management module running a second virtual machine,
   wherein the first virtual machine management module transmits the replication data to the second virtual machine management module while the first virtual machine is running, and the second virtual machine management module receives the replication data and controls a data write operation to a disk of the second virtual machine according to the replication data, when the first virtual machine is paused, the second virtual machine management module performs a snapshot operation on the disk of the second virtual machine to generate snapshot data, wherein the first virtual machine pauses at a checkpoint, and the snapshot data reflects a status of the disk of the first virtual machine at the checkpoint.

8. The backup system for virtual machines according to claim 7, wherein the first virtual machine pauses at a checkpoint, and when the first virtual machine is paused, the first virtual machine management module transmits at least one dirty page of a first memory of the first virtual machine to the second virtual machine management module, and the second virtual machine management module stores the at least one dirty page in a second memory of the second virtual machine in response to receiving the at least one dirty page.

9. The backup system for virtual machines according to claim 8, further comprising: while the first virtual machine is running, the second virtual machine management module updates the second memory of the second virtual machine according to the at least one dirty page.

10. The backup system for virtual machines according to claim 8, wherein in response to expiration of a predetermined cycle of a timer, the first virtual machine paused at a checkpoint, and in response to expiration of the predetermined cycle of the timer, the first virtual machine management module transmits the at least one dirty page of the first memory to the second virtual machine management module.

11. The backup system for virtual machines according to claim 8, wherein in response to accumulation of the at least one dirty page of the first memory to a predetermined data amount, the first virtual machine pauses at a checkpoint, and in response to accumulation of the at least one dirty page of the first memory to the predetermined data amount, the first virtual machine management module transmits the at least one dirty page of the first memory to the second virtual machine management module.

12. The backup system for virtual machines according to claim 7, further comprising: when the first virtual machine fails, the second virtual machine management module performs a rollback operation on the disk of the second virtual machine by using the snapshot data.

* * * * *